US009430061B2

(12) United States Patent
Eruchimovitch (10) Patent No.: US 9,430,061 B2
(45) Date of Patent: Aug. 30, 2016

(54) ULTRASONIC HYBRID INPUT DEVICE AND CORRESPONDING TUNING METHOD (71) Applicant: QUALCOMM INCORPORATED, San Diego, CA (US)

(72) Inventor: Baruch Eruchimovitch, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 13/788,341

(22) Filed: Mar. 7, 2013

(65) Prior Publication Data

US 2014/0253442 A1  Sep. 11, 2014

(51) Int. Cl.
*G06F 3/0354* (2013.01)
*G06F 3/041* (2006.01)
*G06F 3/043* (2006.01)
*B43K 29/00* (2006.01)
*B43K 29/08* (2006.01)
*B43K 29/12* (2006.01)

(52) U.S. Cl.
CPC ........... *G06F 3/03545* (2013.01); *B43K 29/00* (2013.01); *B43K 29/004* (2013.01); *B43K 29/08* (2013.01); *B43K 29/12* (2013.01); *G06F 3/0416* (2013.01); *G06F 3/0433* (2013.01)

(58) Field of Classification Search
CPC ............. G06F 3/03545; G06F 3/0416; G06F 3/0433; B43K 29/00; B43K 29/08; B43K 29/12; B43K 29/004
USPC .................................................. 345/156–158
See application file for complete search history.

(56) References Cited

U.S. PATENT DOCUMENTS

| 7,279,646 B2* | 10/2007 | Xu ........................ G06F 3/0346 178/18.01 |
| 2002/0060665 A1* | 5/2002 | Sekiguchi ............. G06F 3/0346 345/157 |
| 2002/0130850 A1* | 9/2002 | Kobayashi ............ G06F 3/0346 345/180 |
| 2003/0122803 A1 | 7/2003 | Chuang |
| 2004/0032399 A1* | 2/2004 | Sekiguchi ........... G06F 3/03545 345/173 |
| 2011/0015893 A1* | 1/2011 | Altman ..................... G06F 1/12 702/150 |
| 2012/0235934 A1 | 9/2012 | Kawasaki et al. |
| 2012/0331546 A1 | 12/2012 | Falkenburg et al. |

FOREIGN PATENT DOCUMENTS

WO   WO-2011008533 A2   1/2011

OTHER PUBLICATIONS

International Search Report and Written Opinion—PCT/US2014/018746—ISA/EPO—Oct. 28, 2014.
Partial International Search Report—PCT/US2014/018746—ISA/EPO—Jul. 23, 2014.

* cited by examiner

*Primary Examiner* — Amare Mengistu
*Assistant Examiner* — Jennifer Zubajlo
(74) *Attorney, Agent, or Firm* — Austin Rapp & Hardman (57) ABSTRACT A hybrid input device is described. The hybrid input device includes a stylus for writing on a touchscreen, a writing instrument and a pressure sensor. The hybrid input device also includes an ultrasonic transmitter that transmits an ultrasonic data pattern. The hybrid input device also includes a control element that toggles ultrasonic functionality of the hybrid input device.

17 Claims, 11 Drawing Sheets

ULTRASONIC HYBRID INPUT DEVICE AND CORRESPONDING TUNING METHOD

TECHNICAL FIELD

The present disclosure relates generally to electronic devices. More specifically, the present disclosure relates to an ultrasonic hybrid input device and a corresponding tuning method.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society.

In various situations, it may be desirable for electronic devices to communicate with each other. Communication between electronic devices may be beneficial. For example, communication between electronic devices may allow one electronic device to utilize the functionality of another electronic device. In many cases, a communications interface may be used for communication between one or more electronic devices.

Users may desire a variety of features in electronic devices. As can be observed from this discussion, an ultrasonic hybrid input device and corresponding tuning method may be beneficial.

SUMMARY

A hybrid input device is disclosed. The hybrid input device includes a stylus for writing on a touchscreen, a writing instrument and a pressure sensor. The hybrid input device also includes an ultrasonic transmitter that transmits an ultrasonic data pattern. The hybrid input device also includes a control element that toggles ultrasonic functionality of the hybrid input device.

The control element may toggle ultrasonic functionality based on received ultrasonic commands from a wireless communication device. Alternatively, the control element may select the touchscreen stylus or the writing instrument to protrude from the housing based on a proximity of the hybrid input device to a wireless communication device. The ultrasonic data pattern may include a unique identification value for the hybrid input device, a pressure sensor value and a status value of the control element, or some combination. The pressure may the pressure at which the writing instrument is pressed against a surface. The ultrasonic transmitter may transmit ultrasonic data periodically. The stylus may be recognized by a capacitive touchscreen, a resistive touchscreen, or some combination.

A method for using a hybrid input device is also disclosed. A touchscreen is written on with a touchscreen stylus in the hybrid input device. Ultrasonic functionality is turned on or off based on a control element status associated with the hybrid input device. An ultrasonic data pattern is transmitted based on whether ultrasonic functionality is turned on or off.

A hybrid input device is also disclosed. The hybrid input device includes means for writing on a touchscreen. The hybrid input device also includes means for writing off the touchscreen. The hybrid input device also includes means for turning on or off ultrasonic functionality of the hybrid input device. The hybrid input device also includes means for transmitting an ultrasonic data pattern based on whether ultrasonic functionality is turned on or off.

A method for tuning an ultrasonic tracking algorithm is also disclosed. Touchscreen coordinate points and ultrasonic coordinate points are received. The touchscreen coordinate points and ultrasonic coordinate points are compared. Tuning parameters are determined for the ultrasonic tracking algorithm based on the comparing.

The method may be performed by a wireless communication device. In a semi-automatic configuration, the receiving may include indicating a prompt to touch a hybrid input device to a touchscreen. In an automatic configuration, the receiving may include receiving, from a hybrid input device, a first predetermined number of touch events after occurrence of a second predetermined number of touch events. The tuning parameters may be applied to offset imprecision due to temperature, humidity, or both.

An apparatus for tuning an ultrasonic tracking algorithm is also disclosed. The apparatus includes means for receiving touchscreen coordinate points and ultrasonic coordinate points. The apparatus also includes means for comparing the touchscreen coordinate points and ultrasonic coordinate points. The apparatus also includes means for determining tuning parameters for the ultrasonic tracking algorithm based on the comparing.

A computer-program product for tuning an ultrasonic tracking algorithm is also disclosed. The computer-program product comprises a computer-readable medium having instructions thereon. The instructions may include code for causing a wireless communication device to receive touchscreen coordinate points and ultrasonic coordinate points. The instructions may also include code for causing the wireless communication device to compare the touchscreen coordinate points and ultrasonic coordinate points. The instructions may also include code for causing the wireless communication device to determine tuning parameters for the ultrasonic tracking algorithm based on the comparing.

An apparatus for tuning an ultrasonic tracking algorithm is also disclosed. The apparatus includes a processor and memory in electronic communication with the processor. Executable instructions are stored in the memory. The instructions are executable to receive touchscreen coordinate points and ultrasonic coordinate points. The instructions are also executable to compare the touchscreen coordinate points and ultrasonic coordinate points. The instructions are also executable to determine tuning parameters for the ultrasonic tracking algorithm based on the comparing.

DETAILED DESCRIPTION

Some mobile devices (e.g. smartphones, tablets) may utilize input devices (e.g. stylus, pen) based on ultrasound technology, i.e., special software for ultrasound-based position calculation may run on the mobile device. Additionally, touchscreen stylus technology may also be used due to good precision and performance as well as usage improvement (e.g., S-Pen software developer kit). Mobile devices running applications may have different requirements for input devices used for pointing, i.e., a normal touchscreen stylus may work relatively well for simple handwriting, standard user interfaces and games on the mobile device's display, but an ultrasound pen/stylus may be better for off-display (close to the mobile device) handwriting because it is more precise. Unfortunately, ultrasound-based position calculation precision depends on environmental conditions, e.g. temperature and humidity.

The present systems and methods may solve some of the following issues. First, requiring two different (standard touchscreen and ultrasonic) input devices for different types of applications on the mobile device may be expensive and inconvenient for a user. Second, additional mobile resources (e.g. sensors) are required for periodic tuning of the mobile algorithm calculating ultrasonic pen position. In some configurations, the mobile device periodically transmits a pre-defined ultrasound pattern, and tunes the algorithm upon receiving the echoed ultrasound pattern. However, this may be problematic because it may use additional mobile device resources (speaker or earpiece). This may also cause issue of concurrency with audio/voice transmitting.

To solve these problems, the present systems and methods may include a hybrid input device and a tuning module on the mobile device, i.e., the tuning module may work together with an ultrasound-based position calculation module running on the mobile device. The hybrid input device may include one touchscreen stylus for on-display user interface activity, a one- or multi-color pen for off-display ultrasound based handwriting or drawing, an ultrasound transmitter and a control element (e.g., control button) to select a touchscreen mode or ultrasonic mode of the hybrid input device. Therefore, a single hybrid input device may include both touchscreen and ultrasonic off-display functionality, solving the first problem described above.

Such a device and tuning module may also solve the second issue. Specifically, during on-display touching by the touchscreen stylus, the device's ultrasound transmitter may periodically eject the ultrasound pattern. During a tuning period, the tuning module may get touchscreen coordinates from the touchscreen driver and derived ultrasonic points and calculate the tuning parameters upon a comparison of the touchscreen coordinates and ultrasonic coordinates. This may avoid expensive mobile device resource usage (e.g. sensors) for the ultrasonic algorithm tuning. As used herein, the term "ultrasonic" refers to a frequency band above human hearing, e.g., 25-80 KHz, 20-80 KHz, etc.

Figure 1:
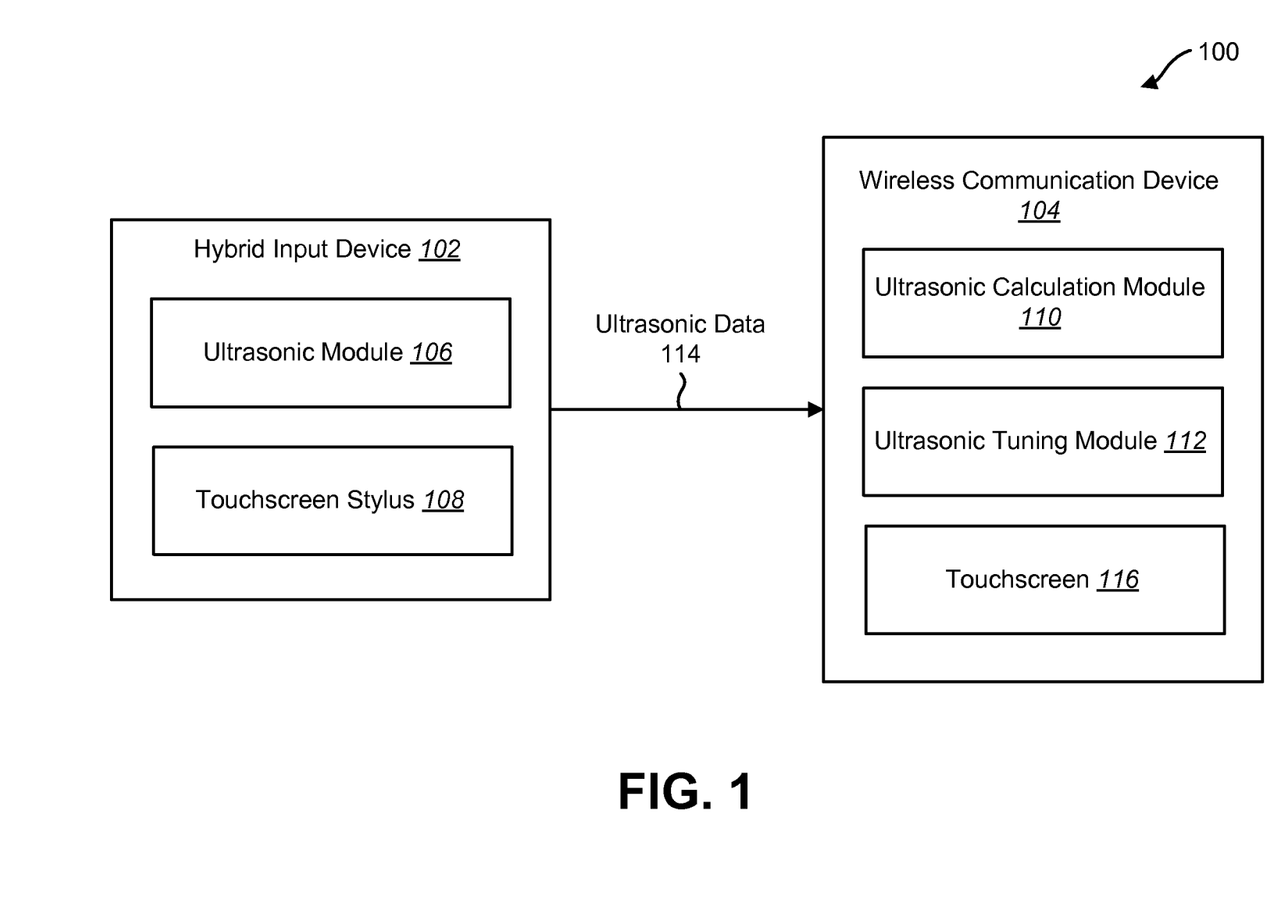
FIG. 1 is a block diagram illustrating a wireless communication system in which a hybrid input device may be used.

FIG. 1 is a block diagram illustrating a wireless communication system 100 in which a hybrid input device 102 may be used. In the system 100, a hybrid input device 102 may communicate with a wireless communication device 104. The wireless communication device 104 may also be referred to as a mobile device, mobile station, subscriber station, client, client station, user equipment (UE), remote station, access terminal, mobile terminal, terminal, user terminal, subscriber unit, etc. Examples of communication devices include laptop or desktop computers, cellular phones, smart phones, wireless modems, e-readers, tablet devices, gaming systems, etc. Some of these devices may operate in accordance with one or more industry standards. While the present systems and methods are described and illustrated using a wireless communication device 104, any suitable electronic device may be used. The terms "hybrid input device" and "hybrid pen" may be used interchangeably herein.

Ultrasonic technology may be used to track the location of certain devices. For example, a digital pen may use ultrasonic tracking as a means of transferring handwriting or drawing to a digital device. In one configuration, a dedicated ultrasonic receiver may be attached by clip to a handwriting work area. The work area position (relative to the receiver) and size may be supplied to a point calculation algorithm during a calibration process. A user may be prompted by a calibration application to point sequentially at a pre-defined point in the work area (e.g. 4 corners and center). The receiver's coordinate system (RCS0) position, relative to the work area, may not be changed until the work area is attached to the receiver. The receiver may calculate points in RCS0 (upon ultrasonic data collected by the receiver's microphones) and pass them with the pen's switches status (e.g. up/down) to the host via universal serial bus (USB) connection. The host may map the received points into its destination window.

In contrast, the present systems and methods may utilize a wireless communication device 104 as an ultrasonic receiver. The wireless communication device 104 may include an ultrasonic calculation module 110 that calculates the position of the hybrid input device 102 based on ultrasonic data 114 received from the hybrid input device 102. The wireless communication device 104 may also include an ultrasonic tuning module 112 to calibrate, or tune, the ultrasonic calculation module 110. The wireless communication device 104 may also include two or more microphones for receiving voice and ultrasonic data 114. An ultrasonic module 106 in the hybrid input device 102 may transmit ultrasonic data 114 that includes one or more of the following data: a unique pen identifier, a pressure sensor value that indicates whether the input device touches a surface and a control element status. The control element on the hybrid input device 102 may toggle ultrasonic functionality. In one configuration, the control element may be a button, e.g. on the exterior of the hybrid input device 102. In another configuration, the control element may receive ultrasonic commands from a wireless communication device to start or stop ultrasonic transmitting. This may decrease power consumption of the hybrid input device 102.

During operation, a user may use a touchscreen stylus 108 in the hybrid input device 102 to interact with the touchscreen 116 on the wireless communication device 104. The user may also use a writing instrument (e.g., pen) to write or draw off-display. In order to tune the ultrasonic tracking, the ultrasonic tuning module 112 may compare multiple touch events received at the wireless communication device 104 with simulated touch events created from ultrasonic data 114 at a similar point in time. In other words, the touch event is used to tune the ultrasonic tracking. As used herein, a "touch event" is a notification about touching of the touchscreen 116 by a finger, stylus 108 or other tool. Such events may be produced (e.g., by a touchscreen driver) and provided to applications. A touch event may include two-dimensional coordinates and a touch pressure.

Figure 2A:
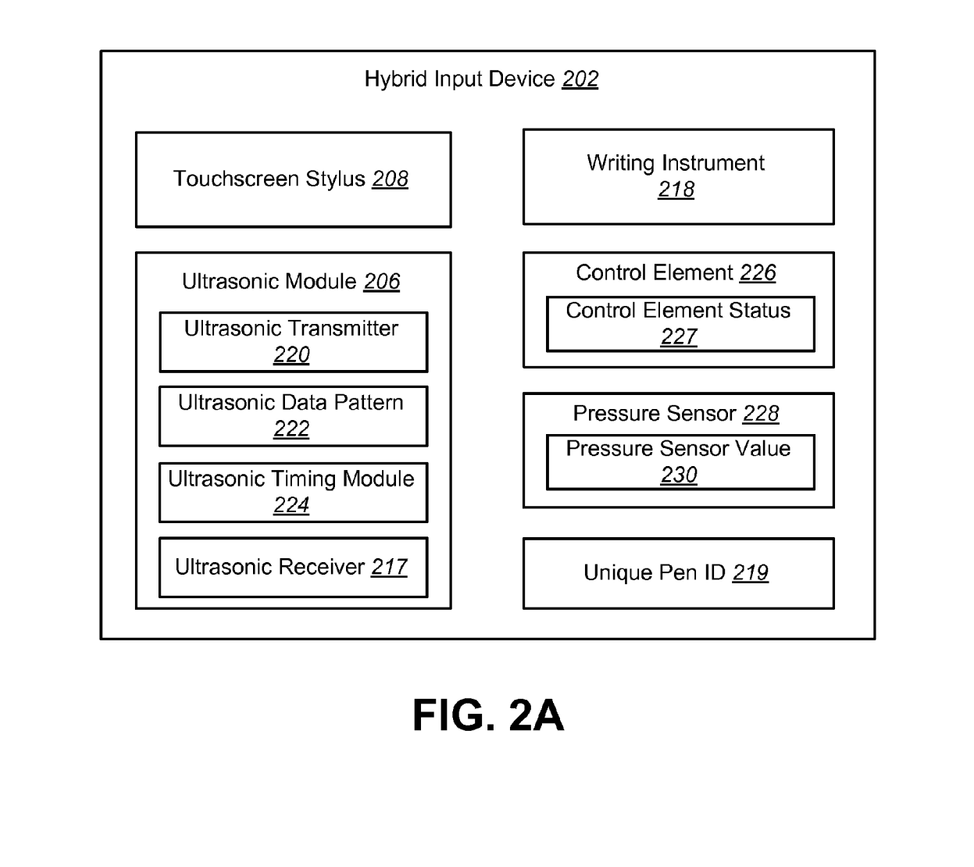
FIG. 2A is a block diagram illustrating a hybrid input device.

FIG. 2A is a block diagram illustrating a hybrid input device 202. The hybrid input device 202 may include a standard touchscreen stylus 208 and a writing instrument 218 (e.g., a pen with one or more colors) for off-display, ultrasonic-based handwriting and drawing, i.e., off-display writing or drawing with the writing instrument 218 that is tracked using ultrasonic communication. The touchscreen stylus 208 may be suitable for simple handwriting, standard user interfaces and games on a mobile device's display. The writing instrument 218 used off-display (close to the wireless communication device 104) may be better suited for more precise handwriting or drawing.

The hybrid input device 202 may also include an ultrasonic module 206 that includes an ultrasonic transmitter 220 and an ultrasonic timing module 224. The ultrasonic transmitter 220 may transmit an ultrasonic data pattern 222 at a particular data rate, e.g., using timing from the ultrasonic timing module 224. The ultrasonic data pattern 222 may include telemetry data, such as some combination of a unique pen identifier 219, a pressure sensor value 230 and a control element status 227. For example, the hybrid input device 202 may transmit at 192 KHz, 96 KHz, etc. The data format (i.e., the specific bit allocation to each element in the ultrasonic data pattern 222) may vary, but the present systems and methods may be used with any suitable configuration and manufacturer of ultrasonic pens.

A user may be able to easily select the desired component for the desired application, i.e., off-display handwriting (along with the writings storing or presenting on the wireless communication device 104, by using the ultrasonic-based pointing algorithm), on-display touching using the touchscreen stylus 208 or on-display touchscreen functionality simulation by using the ultrasonic based pointing algorithm.

The control element 226 in the hybrid input device 202 may be implemented in any suitable way, e.g., button, switch, dial, etc. Alternatively, the control element 226 may be an internal module that receives control commands from a wireless communication device 104 to start or stop ultrasonic transmitting, e.g., to reduce power consumption in the hybrid input device 202. For example, the hybrid input device 202 may include an ultrasonic receiver 217 to receive control commands from the wireless communication device 104, which may use one of its standard audio ports (e.g., earpiece) for ultrasonic transmitting. In addition to start/stop ultrasonic transmitting commands, the wireless communication device 104 may send a command to switch to between the touchscreen stylus 208 and the writing instrument 218 based on the current position of the wireless communication device. For example, the command may switch to the touchscreen stylus 208 when the hybrid input device 202 is close (e.g., 2, 4, 6, 8, 10, 12 inches) to the wireless communication device 104. Conversely, the command may switch to the writing instrument 218 when the hybrid input device 202 is far (e.g., 2, 4, 6, 8, 10, 12 inches) from the wireless communication device 104.

The pressure sensor 228 may also be implemented in any suitable way. For example, the pressure sensor value 230 may be a single bit that indicates whether or not any pressure is applied at the writing instrument 218 in a binary fashion, e.g., 1 for pressure, 0 for no pressure. Alternatively, the pressure sensor value 230 may be multiple bits and indicate the amount of pressure exerted at the writing instrument 218, e.g., a four-bit value where 0 indicates no pressure and 16 (1111 at the bit level) indicates a maximum pressure.

Figure 2B:
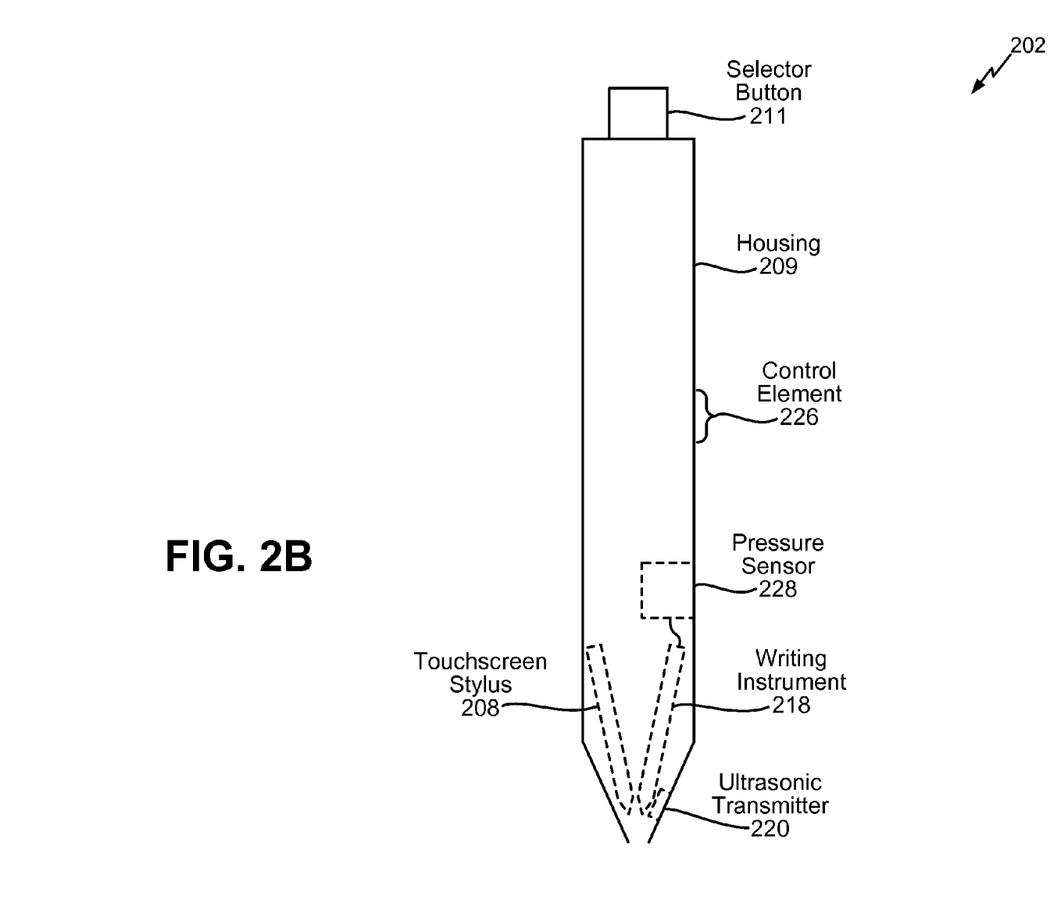
FIG. 2B is a cross-sectional diagram illustrating one configuration of a hybrid input device.

FIG. 2B is a cross-sectional diagram illustrating one configuration of a hybrid input device 202. The hybrid input device 202 may include various elements inside a housing 209, e.g., made of metal, plastic, etc. In the illustrated configuration, the housing may include a cylindrical section that tapers to a small opening through which a writing instrument 218 or touchscreen stylus 208 may protrude, although any suitable configuration of the housing 209 may be used. Furthermore, there may be multiple writing instruments 218 included in the housing, e.g., different colored pens, pencil, etc. Inside the housing, the writing instrument 218 may be coupled to a pressure sensor that determines a pressure sensor value 230, i.e., an indication of whether or not any pressure is applied at the writing instrument 218. Furthermore, an ultrasonic transmitter 220 may reside in the housing near the opening through which the writing instrument 218 or touchscreen stylus 208 protrudes. Placing the ultrasonic transmitter 220 close to the point of the housing 209 may enable more accurate tracking than placing it further away from the point of the housing 209. The housing may also include a control element 226, e.g., button, switch or dial that turns on or off ultrasonic functionality. Furthermore, a selector button 211 may control which, if any, of the touch screen stylus 208 or writing instrument(s) 218 protrude from the housing at any time. Although the hybrid input device 202 is illustrated in a particular configuration in FIG. 2B, any suitable configuration may be used with the present systems and methods.

Figure 2C:
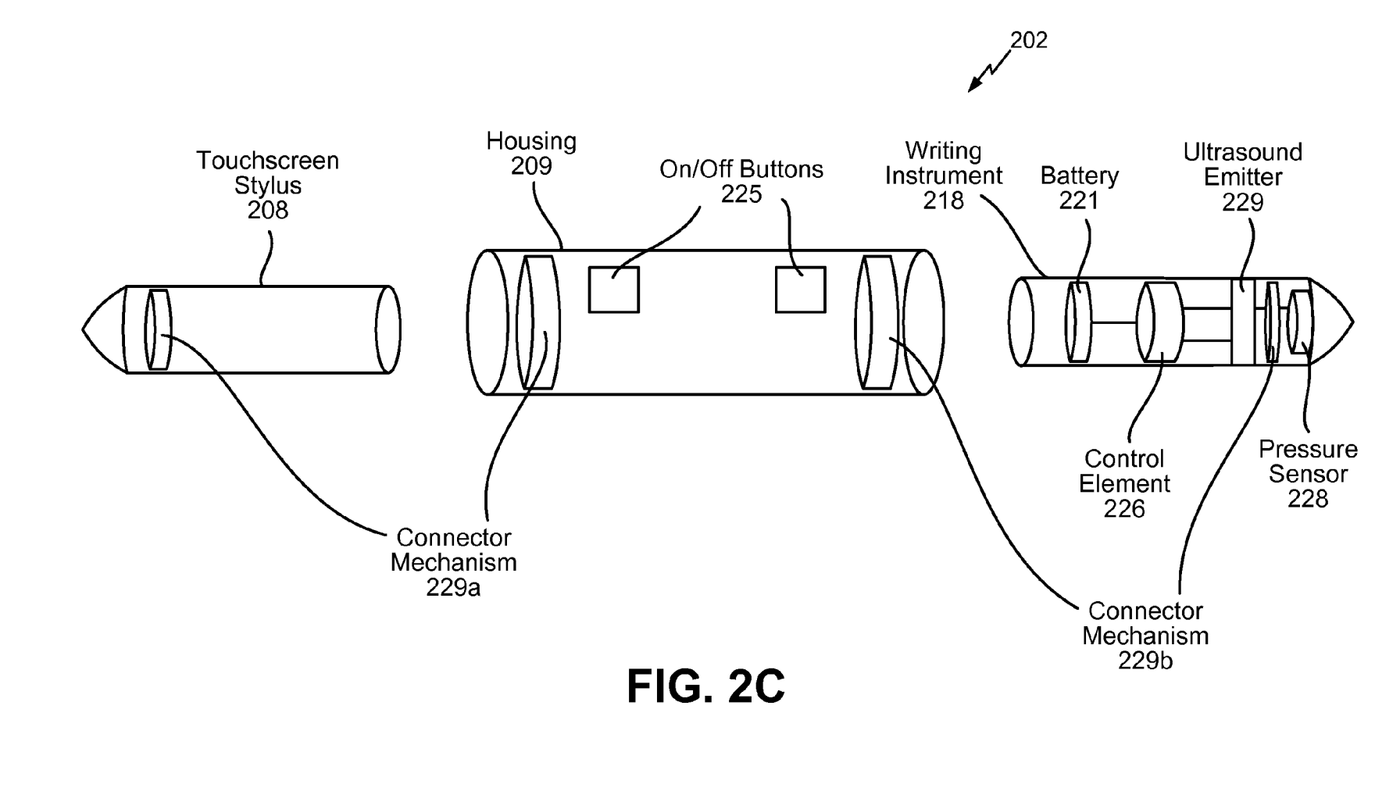
FIG. 2C is a cross-sectional diagram illustrating another possible configuration of a hybrid input device.

FIG. 2C is a cross-sectional diagram illustrating another possible configuration of a hybrid input device 202. The hybrid input device 202 may include some or all of the elements illustrated in FIG. 2B. However, the configuration illustrated in FIG. 2C may be modular, allowing a user to configure the hybrid input device 202 according to their needs. For example, a housing 209 may receive a touchscreen stylus 208 at one end and a writing instrument 218 at an opposite end, i.e., in addition to emerging from the housing 209, the touchscreen stylus 208 and the writing instrument 218 may be completely detachable (e.g., for replacement) from the housing 209. In other words, the modules (touchscreen stylus 208 or the writing instrument 218) may be removed from the housing and replaced with a different module. Furthermore, the writing instrument may itself contain all necessary elements for ultrasonic tracking, i.e., a battery 221, ultrasonic emitter 229, control element 226 and a pressure sensor 228. Additionally, each of the touchscreen stylus 208 and the writing instrument 218 may attach to the housing a connector mechanism 229*a-b*. The connector mechanisms 229*a-b* may use any suitable attachment technique, e.g., magnets, an indented notch in the housing that receives a corresponding protrusion on the touchscreen stylus 208 or writing instrument 218, complementary threading on each of the housing and the module (similar to a screw thread), etc. The housing may also include on/off buttons 225 for ultrasonic functionality.

Figure 2D:
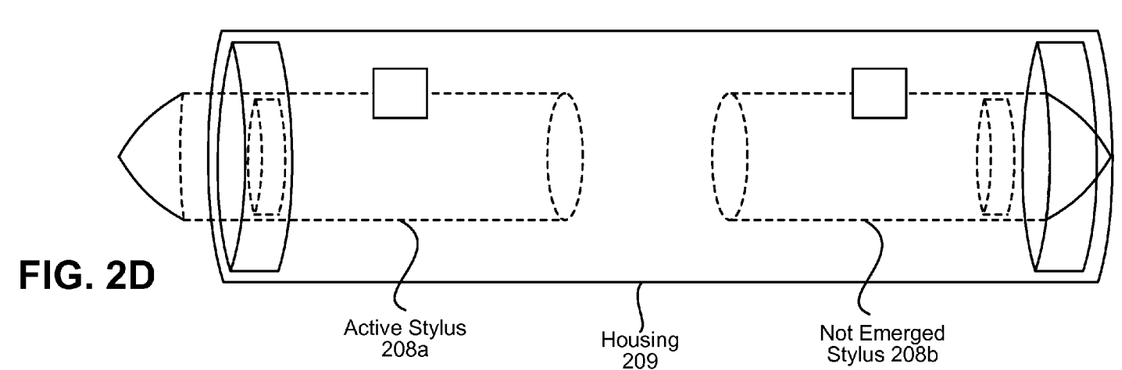
FIG. 2D is a cross-sectional diagram illustrating another possible configuration of a hybrid input device.

FIG. 2D is a cross-sectional diagram illustrating another possible configuration of a hybrid input device. Specifically, FIG. 2D illustrates a configuration with two touchscreen styli 208*a-b* in the housing 209. In the illustrated configuration, a first active stylus 208*a* is emerged from the housing and available for use. In contrast, the not emerged stylus 208*b* is not available for use. In one configuration, one of the styli may be used for marking on a touchscreen while the other may be used as an "eraser." In other words, the touchscreen may remove previous marking when the "eraser" stylus is moved over a portion of the touchscreen.

Figure 2E:
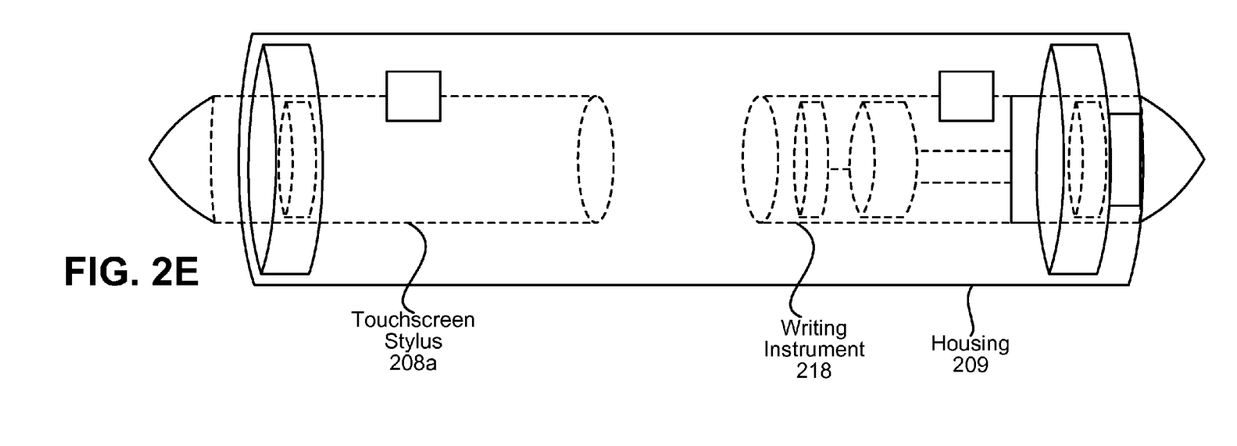
FIG. 2E is a cross-sectional diagram illustrating another possible configuration of a hybrid input device.

FIG. 2E is a cross-sectional diagram illustrating another possible configuration of a hybrid input device. Specifically, FIG. 2E illustrates a configuration with an emerged touchscreen stylus 208 and an emerged writing instrument 218. In other words, both may be available at the same time. Alternatively, the housing may include two writing instruments 218, e.g., each including different color pens or pencils.

Figure 3:
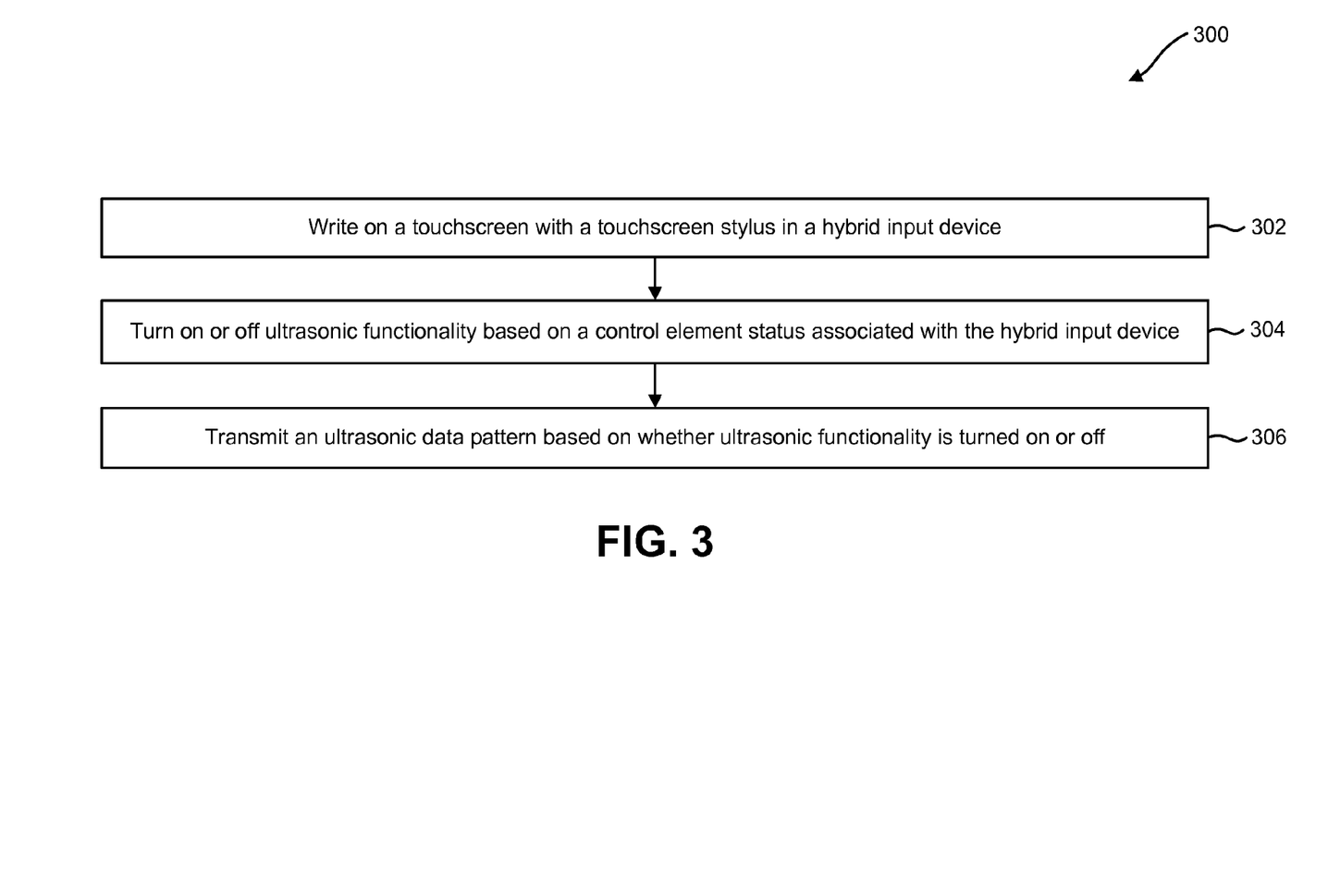
FIG. 3 is a flow diagram illustrating a method for using a hybrid input device.

FIG. 3 is a flow diagram illustrating a method 300 for using a hybrid input device 202. The method 300 may be performed by user of a hybrid input device 202. The user may write 302 on a touchscreen 116 with a touchscreen stylus 208 in a hybrid input device 202. As used herein, the term "touchscreen" refers to a technology that receives input via touch, e.g., capacitive touchscreens (surface or projected), resistive touchscreens, etc. Ultrasonic functionality may be turned on or off 304 based on a control element status 227 associated with the hybrid input device 202. This may include a user activating a button or switch on the device 202. Alternatively, the control element 226 may be an internal module that receives ultrasonic commands (e.g., using an ultrasonic receiver 217) from a wireless communication device 104. For example, the commands may start or stop ultrasonic transmitting at the hybrid input device 202 in order to reduce power consumption. Alternatively, the commands may enable automatic switching between the touchscreen stylus 208 and the writing instrument 218, e.g., based on proximity from the wireless communication device 104. The hybrid input device 202 may also transmit 306 an ultrasonic data pattern 222 based on whether ultrasonic functionality is turned on or off. Specifically, the ultrasonic data pattern 222 may be transmitted when ultrasonic functionality is turned on, but not transmitted when ultrasonic functionality is turned off.

Figure 4:
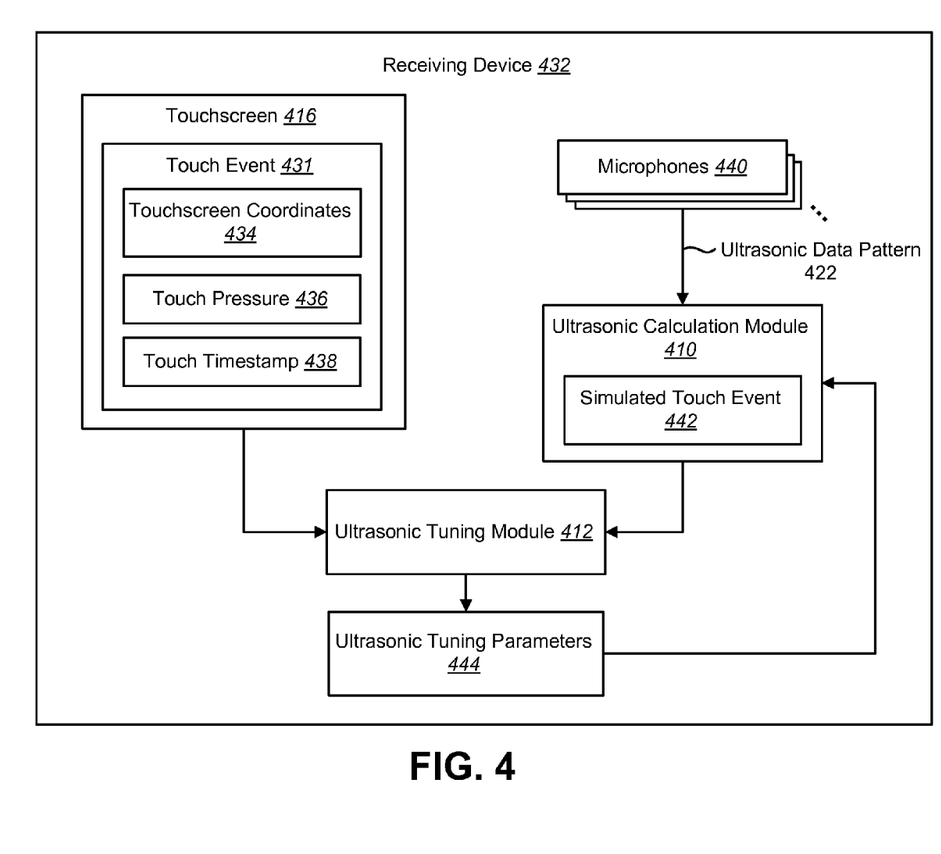
FIG. 4 is a block diagram illustrating a receiving device.

FIG. 4 is a block diagram illustrating a receiving device 432. The receiving device 432 may be any electronic device with a touchscreen and capable of receiving ultrasonic signals. For example, the receiving device 432 may be a wireless communication device 104. The receiving device 432 may collect ultrasonic data 114 (e.g., an ultrasonic data pattern 422 including some combination of a unique pen ID 219, a pressure sensor value 230 and a control element status 227) at microphones 440 and calculate a 3-dimensional position, e.g., by using multilateration (also known as time difference of arrival (TDOA)). In other words, the receiving device 432 may use the difference in times of arrival at the different microphones 440 to calculate the location of a hybrid input device 202. The control element status 227 may be also used by applications running on the receiving device 432.

The receiving device 432 may include two or more microphones 440. Each microphone 440 may be used for ultrasonic and audio/voice mutual capturing. For example, the receiving device 432 may include three microphones 440 from which 3-dimensional coordinates may be determined by the ultrasonic calculation module 410, e.g., using multilateration (TDOA). Such a configuration with three voice/ultrasound microphones 440 may enable 3-dimensional applications on the receiving device 432. Alternatively, the receiving device may only include two microphones 440 from which 2-dimensional coordinates may be determined by the ultrasonic calculation module 410, e.g., using time of arrival (TOA).

An ultrasonic calculation module 410 may use the calculated coordinates of the hybrid input device 202 and the pressure sensor value 230 to create simulated touch events 442. The simulated touch events 442 may include a 3-dimensional position of the hybrid input device 202 at a point in time indicated by a simulated touch event timestamp. The 3-dimensional position may be determined by the ultrasonic data pattern 422. The simulated touch event 442 may also include a pressure sensor value that indicates the pressure at which the pen (or other writing instrument) is pressed against a surface.

In addition to the simulated touch events 442, the receiving device 432 may include touch events 431 generated by a touchscreen 416 or touchscreen driver about touching of the receiving device 432 by a finger, stylus or other tool. Each touch event 431 may include some combination of the following: 2-dimensional touchscreen coordinates 434, a touch pressure 436 and a touch timestamp 438.

An ultrasonic tuning module 412 may ensure the ultrasonic tracking is precise. This may include comparing the multiple touch events 431 to a simulated touch event 442 to determine one or more ultrasonic tuning parameters 444. During operation, the ultrasonic tuning module 412 (e.g., running in the kernel) may store a number of most recent touch events 431, e.g., all touch events 431 for the past 10 msec. Usually, all touch events 431 within this period will have the same coordinates. The ultrasonic tuning module 412 may search the stored touch events 431 for a touch event 431 with a touch timestamp 438 that is close to the timestamp for a particular simulated touch event 442 from the ultrasonic calculation module 410, e.g., within 5 msec. The touch event 431 with a touch timestamp 438 that most closely matches a particular simulated touch event 442 may be referred to as a best touch event. In other words, the best touch event may be the one measured closest in time to a particular simulated touch event 442.

Upon comparing the matching points, some tuning parameters 444 of the algorithm are re-calculated. Since the precision of touch events 431 is less influenced by environmental conditions, the touch events 431 may be more accurate than the simulated touch events 442. Therefore, the difference between the touchscreen coordinates 434 in the best touch event and the coordinates in the simulated touch event 442 may be used to determine or re-calculate ultrasonic tuning parameters 444, e.g., current speed of sound. It should be noted that the coordinates of the simulated touch event 442 may be converted from 3 dimensions to 2 dimensions before this comparison is performed, i.e., the Z coordinate may be set to 0 in the simulated touch event 442 before the ultrasonic tuning module 412 compares the two sets of coordinates. Furthermore, the ultrasonic tuning parameters 444 may be algorithm-dependent, however, the present systems and methods may be used to tune any suitable parameter. For example, Table 1 and Table 2 illustrate how the speed of sound changes with respect to temperature and air density (related to humidity) and how this variability may affect the precision of ultrasonic tracking. Therefore, the speed of sound is one possible ultrasonic tuning parameter 444 that may be tuned.

TABLE 1

| Temperature of Air (degrees Celsius) | Speed of Sound (c) (m/s) | Density of Air (kg/m$^3$) | Acoustic Impedance of Air (Z) (N-s/m$^3$) |
| --- | --- | --- | --- |
| −10 | 325.4 | 1.341 | 436.5 |
| −5 | 328.5 | 1.316 | 432.4 |
| 0 | 331.5 | 1.293 | 428.3 |

TABLE 1-continued

| Temperature of Air (degrees Celsius) | Speed of Sound (c) (m/s) | Density of Air (kg/m$^3$) | Acoustic Impedance of Air (Z) (N-s/m$^3$) |
|---|---|---|---|
| 5 | 334.5 | 1.269 | 424.5 |
| 10 | 337.5 | 1.247 | 420.7 |
| 15 | 340.5 | 1.225 | 417.0 |
| 20 | 343.4 | 1.204 | 413.5 |
| 25 | 346.3 | 1.184 | 410.0 |
| 30 | 349.2 | 1.164 | 406.6 |

TABLE 2

| | Temperature of Air (degrees Celsius) | | |
|---|---|---|---|
| | 10 | 20 | 30 |
| | Speed of Sound (c) (m/s) | | |
| Time (msec) | 337 Measured Distance (cm) | 343 Measured Distance (cm) | 349 Measured Distance (cm) |
| 0.1 | 1.7 | 1.7 | 1.7 |
| 0.2 | 3.4 | 3.4 | 3.5 |
| 0.5 | 8.4 | 8.6 | 8.7 |
| 1 | 16.9 | 17.2 | 17.5 |
| 2 | 33.7 | 34.3 | 34.9 |

The revised ultrasonic tuning parameters 444 may then be used by the ultrasonic calculation module 410 when determining ultrasonic coordinates based on ultrasonic data patterns 422. For example, the speed of sound may be adjusted to account for current environmental conditions, which allows the ultrasonic coordinates to be more accurate.

Figure 5:
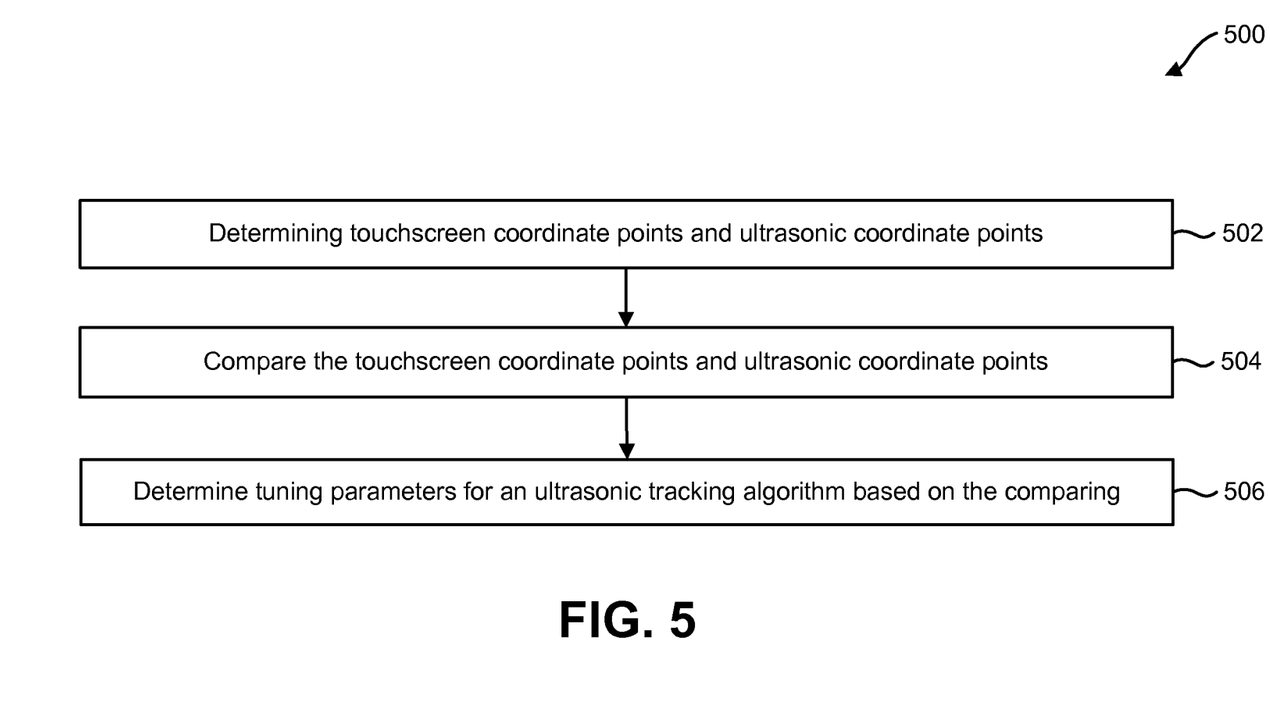
FIG. 5 is a flow diagram illustrating a method for tuning an ultrasonic tracking algorithm.

FIG. 5 is a flow diagram illustrating a method 500 for tuning an ultrasonic tracking algorithm. The method 500 may be performed by a receiving device 432, e.g., a wireless communication device 104. The receiving device 432 may determine 502 touchscreen coordinates 434 and ultrasonic coordinates. The touchscreen coordinates 434 may be included in a touch event 431, e.g., from a touchscreen driver. The ultrasonic coordinates may be determined from an ultrasonic data pattern 422 received at multiple microphones 440. This may include an ultrasonic calculation module 410 in the receiving device 432 calculating a 3-dimensional position, e.g., by using multilateration (also known as time difference of arrival (TDOA)). In other words, the receiving device 432 may use the difference in times of arrival at the different microphones 440 to calculate the location of a hybrid input device 202. The receiving device 432 may also compare 504 the touchscreen coordinates 434 and ultrasonic coordinates. This may include an ultrasonic tuning module 412 comparing touchscreen coordinates 434 from a best touch event to ultrasonic coordinates from a simulated touch event 442. The receiving device 432 may also determine 506 one or more tuning parameters 444 for an ultrasonic tracking algorithm based on the comparing.

Figure 6:
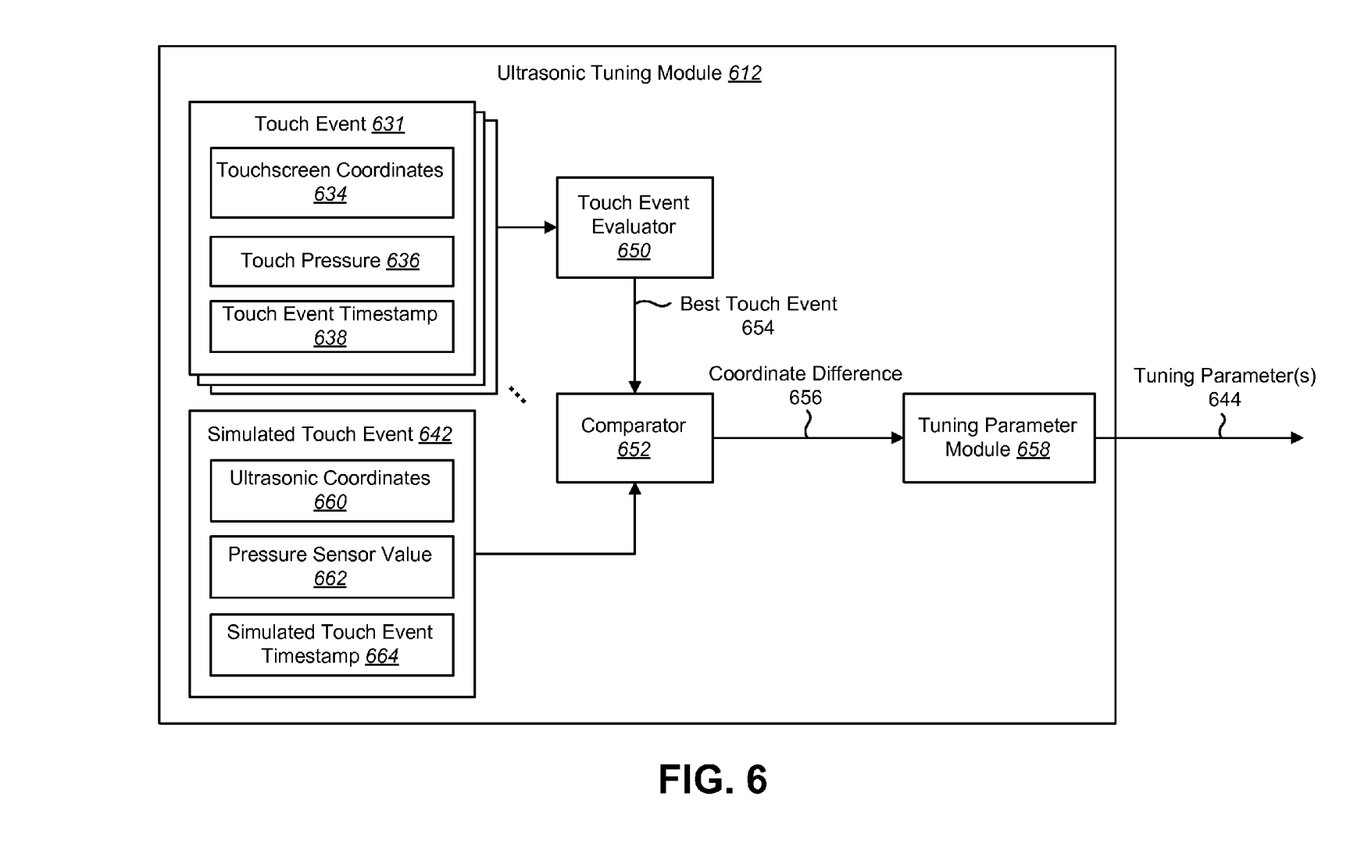
FIG. 6 is a block diagram illustrating an ultrasonic tuning module, e.g., in a receiving device.

FIG. 6 is a block diagram illustrating an ultrasonic tuning module 612, e.g., in a receiving device 432. The ultrasonic tuning module 612 may tune an ultrasonic tracking algorithm by determining one or more tuning parameters 644, e.g., speed of sound. In other words, the ultrasonic tuning module 612 may recalculate tuning parameters 644 to account for current environmental conditions, which allows ultrasonic tracking of a hybrid input device 202 to be more precise.

The ultrasonic tuning module 612 may have multiple touch events 631, each including some combination of touchscreen coordinates 634, a touch pressure 636 and a touch event timestamp 638. The ultrasonic tuning module 612 may also include a simulated touch event 642 determined from an ultrasonic data pattern 422 received from a hybrid input device 202. The simulated touch event 642 may include some combination of ultrasonic coordinates 660 (e.g., determined using multilateration), a pressure sensor value 662 and a simulated touch event timestamp 664.

A touch event evaluator 650 may determine a best touch event 654. This may include evaluating multiple touch events 631 and selecting one with a touch event timestamp 638 that is closest in time to the simulated touch event timestamp 664. The ultrasonic tuning module 612 may store a number of most recent touch events 631, e.g., a predefined number, all touch events 631 within the most recent predefined time period, etc.

The best touch event 654 may be compared to the simulated touch event 642 by a comparator 652. Specifically, a coordinate difference 656 may be determined and output by the comparator 652. The coordinate difference 656 may be the difference between the touchscreen coordinates 634 in the best touch event 654 and the ultrasonic coordinates 660 in the simulated touch event 642. Before comparison, the ultrasonic coordinates 660 may be converted from 3-dimensions to 2-dimensions, e.g., the Z coordinate may be set to zero.

The coordinate difference 656 may be used by a tuning parameter module 658 to determine one or more tuning parameters 644. For example, the tuning parameter module 658 may include a lookup table that identifies a particular tuning parameter 644 (e.g., speed of sound) based on the coordinate difference 656. The tuning parameter(s) 644 may be used by an ultrasonic calculation module 410 when determining ultrasonic coordinates 660 based on ultrasonic data patterns 422. In one configuration, the difference between real and ultrasound coordinates may enable more precise estimation of the speed of sound.

For example, in one semi-automatic configuration, a user turns on an ultrasonic component on a hybrid input device 202 and runs an ultrasonic off-display application, e.g., in a receiving device 432. The application may start the ultrasonic tuning module 612 and the ultrasonic calculation module 410 and prompt the user to touch the display with the hybrid input device 202 with the touchscreen stylus 208, e.g., prompt by speaker or display on the receiving device 432. During the display touch period, the ultrasonic tuning module 612 may collect touch events 631 (e.g., from a touchscreen driver) including touchscreen coordinates 634 and a simulated touch event 642 (e.g., based on a received ultrasonic data pattern 422). The ultrasonic tuning module 612 may also calculate one or more tuning parameters 644 by comparing the touchscreen coordinates 634 (e.g., from a best touch event 654) and the ultrasonic coordinates 660.

Alternatively, in an automatic configuration, the ultrasonic tracking algorithm may be periodically tuned automatically during on-display activity. In this configuration, the hybrid input device 202 and the ultrasonic tuning module 612 are synchronized upon the predefined number of touch events 631, e.g., every 500 touch events 631, the hybrid input device 202 may eject the ultrasonic data pattern 422 for 100 touch events 631. During a tuning period, the ultrasonic tuning module 612 may collect touch events 631 (e.g., from a touchscreen driver) including touchscreen coordinates 634 and a simulated touch event 642 (e.g., based on a received ultrasonic data pattern 422. The ultrasonic tuning module 612 may also calculate one or more tuning parameters 644 by comparing the touchscreen coordinates 634 (e.g., from a best touch event 654) and the ultrasonic coordinates 660.

Figure 7:
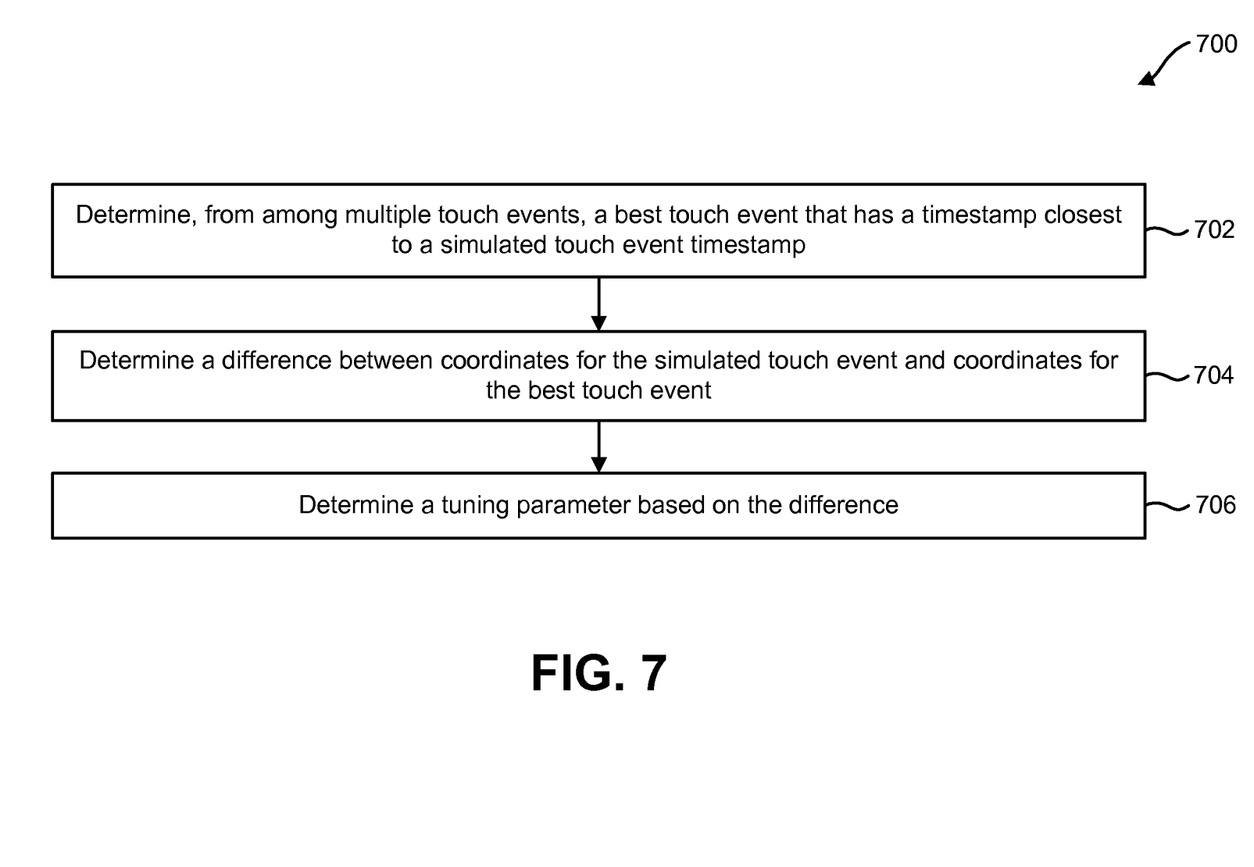
FIG. 7 is a flow diagram illustrating a method for tuning an ultrasonic tracking algorithm.

FIG. 7 is a flow diagram illustrating a method 700 for tuning an ultrasonic tracking algorithm. The method 700 may be performed by an ultrasonic tuning module 612, e.g., in a wireless communication device 104. The ultrasonic tuning module 612 may determine 702, from among multiple touch events, a best touch event 654 that has a timestamp 638 closest to a simulated touch event timestamp 664. This may include evaluating a number of most recent touch events 631 looking for the best touch event 654. The ultrasonic tuning module 612 may also determine 704 a difference 656 between coordinates 660 for the simulated touch event 642 and coordinates 634 for the best touch event 654. The ultrasonic tuning module 612 may also determine 706 a tuning parameter 644 based on the difference 656. For example, the speed of sound may be adjusted to account for current environmental conditions, which allows the ultrasonic coordinates to be more accurate.

Figure 8:
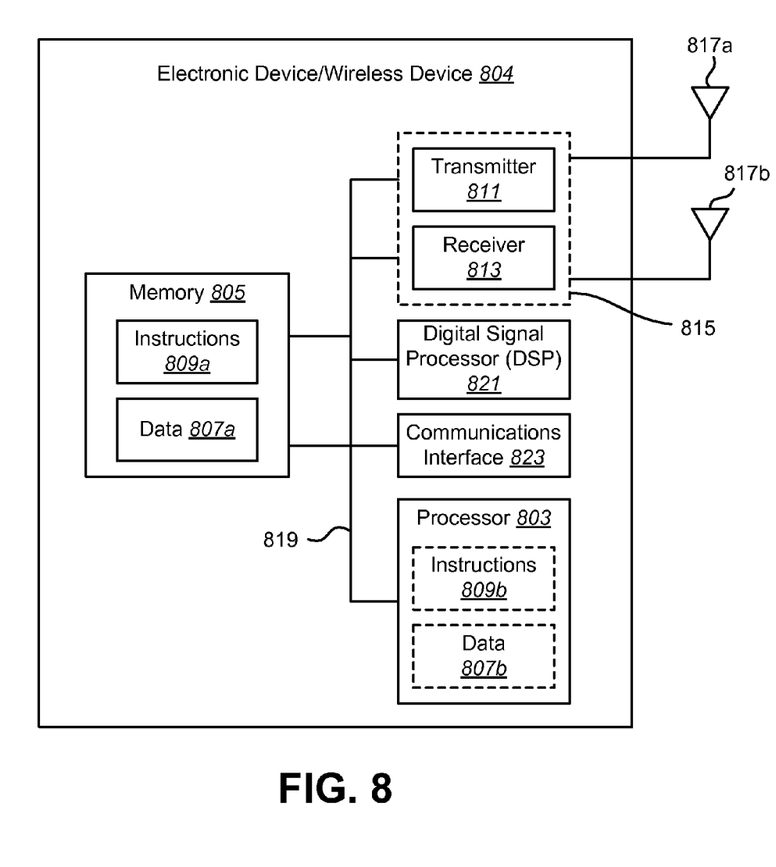
FIG. 8 illustrates certain components that may be included within an electronic device/wireless device.

FIG. 8 illustrates certain components that may be included within an electronic device/wireless device 804. The electronic device/wireless device 804 may be an access terminal, a mobile station, a user equipment (UE), a base station, an access point, a broadcast transmitter, a node B, an evolved node B, etc., such as the wireless communication device 104 illustrated in FIG. 1. The electronic device/ wireless device 804 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the electronic device/ wireless device 804 of FIG. 8, in an alternative configuration, a combination of processors (e.g., an ARM and DSP) could be used.

The electronic device/wireless device 804 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, erasable programmable ROM (EPROM), electrically erasable programmable ROM (EEPROM), registers, and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The electronic device/wireless device 804 may also include a transmitter 811 and a receiver 813 to allow transmission and reception of signals to and from the electronic device/wireless device 804. The transmitter 811 and receiver 813 may be collectively referred to as a transceiver 815. Multiple antennas 817a-b may be electrically coupled to the transceiver 815. The electronic device/ wireless device 804 may also include (not shown) multiple transmitters, multiple receivers, multiple transceivers and/or additional antennas.

The electronic device/wireless device 804 may include a digital signal processor (DSP) 821. The electronic device/ wireless device 804 may also include a communications interface 823. The communications interface 823 may allow a user to interact with the electronic device/wireless device 804.

The various components of the electronic device/wireless device 804 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 5 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A hybrid input device comprising a housing, wherein the housing comprises:
   a touchscreen stylus configured to selectively protrude from the housing;
   a writing instrument configured to selectively protrude from the housing;
   an ultrasonic transmitter configured to transmit an ultrasonic data pattern; and
   a control element configured to toggle ultrasonic functionality of the hybrid input device and configured to switch between the touchscreen stylus and the writing instrument to protrude from the housing based upon a calculated position of the hybrid input device relative to a wireless communication device.

2. The hybrid input device of claim 1, wherein the control element is configured to toggle ultrasonic functionality based on received ultrasonic commands from the wireless communication device.

3. The hybrid input device of claim 1, wherein the ultrasonic data pattern comprises one or more of a unique identification value for the hybrid input device, a pressure sensor value and a status value of the control element.

4. The hybrid input device of claim 1, further comprising a pressure sensor configured to measure the pressure at which the writing instrument is pressed against a surface.

5. The hybrid input device of claim 1, wherein the ultrasonic transmitter is configured to transmit ultrasonic data periodically.

6. The hybrid input device of claim 1, wherein the stylus is configured to be recognized by one or more of a capacitive touchscreen and a resistive touchscreen.

7. A method for using a hybrid input device, comprising:
   writing on a touchscreen with a touchscreen stylus in the hybrid input device;
   turning on or off ultrasonic functionality based on a control element status associated with the hybrid input device;
   transmitting an ultrasonic data pattern based on whether ultrasonic functionality is turned on or off; and
   switching between the touchscreen stylus and a writing instrument to protrude from a housing of the hybrid input device based upon a calculated position of the hybrid input device relative to a wireless communication device.

8. The method of claim 7, wherein the ultrasonic data pattern comprises one or more of a unique identification value for the hybrid input device, a pressure sensor value and a status value of the control element.

9. The method of claim 7, further comprising measuring a pressure at which the writing instrument in the hybrid input device is pressed against a surface.

10. The method of claim 7, wherein the transmitting comprises transmitting ultrasonic data periodically when ultrasonic functionality is turned on.

11. The method of claim 7, wherein the touchscreen stylus is recognized by one or more of a capacitive touchscreen and a resistive touchscreen.

12. The method of claim 7, further comprising replacing the touchscreen stylus or the writing instrument by completely removing it from the housing and inserting a different touchscreen stylus or writing instrument into the housing.

13. A hybrid input device, comprising:
   means for writing on a touchscreen;
   means for writing off the touchscreen;
   means for turning on or off ultrasonic functionality of the hybrid input device;
   means for transmitting an ultrasonic data pattern based on whether ultrasonic functionality is turned on or off; and
   means for switching between a touchscreen stylus and a writing instrument to protrude from a housing of the hybrid input device based upon a calculated position of the hybrid input device relative to a wireless communication device.

14. The hybrid input device of claim 13, wherein the ultrasonic data pattern comprises one or more of a unique identification value for the hybrid input device, a pressure sensor value and a status value of the means for turning on or off ultrasonic functionality.

15. The hybrid input device of claim 13, further comprising means for measuring the pressure at which the means for writing off the touchscreen is pressed against a surface.

16. The hybrid input device of claim 13, wherein the means for transmitting transmits ultrasonic data periodically when ultrasonic functionality is turned on.

17. The hybrid input device of claim 13, wherein the means for writing on the touchscreen is recognized by one or more of a capacitive touchscreen and a resistive touchscreen.

* * * * *